United States Patent [19]

Wrenbeck et al.

[11] Patent Number: 5,192,873

[45] Date of Patent: Mar. 9, 1993

[54] FAIL-OPERATIONAL CONTROL SYSTEM FOR VEHICLE LOADS

[75] Inventors: Bruce R. Wrenbeck, Dearborn; David A. Parker, Westland, both of Mich.

[73] Assignee: United Technologies Automotive, Inc., Dearborn, Mich.

[21] Appl. No.: 660,383

[22] Filed: Feb. 26, 1991

[51] Int. Cl.$^5$ .............................................. H02D 9/26
[52] U.S. Cl. ..................................... 307/38; 307/10.1
[58] Field of Search .......................... 307/10.1, 38–40, 307/113, 115, 441, 219, 640; 361/166, 167, 168.1, 169.1, 189, 199, 191; 364/187

[56] References Cited

U.S. PATENT DOCUMENTS 4,562,528 12/1985 Baba ..................... 364/133
4,947,053 8/1990 Campbell et al. .................. 307/10.1
4,979,066 12/1990 Kawata et al. ....................... 361/10

Primary Examiner—A. D. Pellinen
Assistant Examiner—Aditya Krishnan
Attorney, Agent, or Firm—Michael Grillo

[57] ABSTRACT

A fail-operational control system utilizes low current switches for controlling vehicle high current loads. In a normal mode of operation, the control system utilizes a CPU to control the loads in response to input signals provided to the CPU by the low current switches. In a fail-operational mode of operation, during failure or removal of the CPU, certain high current loads are switched directly by corresponding low current switches to provide continued operation of the certain high current loads.

16 Claims, 3 Drawing Sheets

FAIL-OPERATIONAL CONTROL SYSTEM FOR VEHICLE LOADS

TECHNICAL FIELD

This invention relates to a control system, and more particularly to a fail-operational control system for reliable control of vehicle high current loads with low current switches

BACKGROUND OF THE INVENTION

There are a number of high current loads positioned throughout a vehicle which are controlled by input switches located remote from the loads As used herein, the term "high current load" is intended to refer to both the circuitry that controls the delivery of power to the loads (e.g., relays, integrated circuit drivers, and driver circuitry comprising discrete semiconductor devices which control power delivery to the loads in response to low power digital inputs) and the associated output device to which power is delivered. Examples of vehicle output devices include bidirectional DC inductive motors for operating power seats, power windows and windshield wipers, solenoids for operating door and trunk locks, large lamp loads, etc.

Conventionally, vehicle output devices have been operated using direct high current control which involves switching a source voltage at a high current switch so that the entire current drawn by the device passes through the switch Where direct high current control is not practical due to the distance between the switch and the device, power relays have been placed near the device and a high current switch is used to switch the relay on and off, thereby switching the device on and off.

Direct high current control provides a relatively simple and reliable method of operating vehicle output devices; however, high current switches are bulky and heavy, and contain large volumes of expensive metals. High current switches and relays also typically require a relatively large "wetting" current, i.e., a minimum current supplied to the switch or relay contacts when closed to prevent oxidation of the contacts after repeated operation of the switch or relay. Additionally, many complex memory functions and control routines used to control output devices in most automobiles, and particularly in luxury automobiles, are not available using direct high current control.

In response to the limitations associated with direct high current control, the aforementioned integrated circuit drivers were developed to power and control vehicle output devices. Such integrated circuit drivers comprise both digital and analog circuity for providing power outputs for powering vehicle output devices in response to low power digital inputs. Additionally, certain relays are now available for directly switching power to vehicle output devices in response to low power digital inputs.

Typically a CPU is used to provide digital inputs to integrated circuit drivers or relays. As is known in the art, the term "CPU" is an abbreviation for "central processing unit". As used herein the term "CPU" is intended to refer to signal processors and other suitable signal processing means for providing desired control functions. The CPU provides desirable memory functions and control routines for controlling high current loads. Low current switches used to provide input signals to the CPU are smaller and less expensive than high current switches. Additionally, low current switches require less "wetting" current and have less open circuit leakage than high current switches, and therefore place a lower power demand on the vehicle electrical system.

A problem associated with low current switching is that a failure of the intermediate circuitry, e.g., the CPU between the switches and a driver or relay, completely disables function of the high current loads. These failures are of particular concern when safety related devices are disabled, e.g., windshield wipers, lamps, rear view mirror positioning, seat positioning, etc. Such failures may render the vehicle inoperable until function of the safety related items is restored.

DISCLOSURE OF THE INVENTION

Objects of the invention include provision of a fail-operational control system for increased reliability of controlling vehicle high current loads with low current switches.

According to the present invention, a control system utilizes a CPU which is responsive to commands provided by low current switches for controlling vehicle high current loads, the control system having a fail-operational mode of operation during failure or removal of the CPU wherein certain high current loads are switched directly by corresponding low current switches to provide continued operation of the certain high current loads.

According to a further aspect of the present invention, the control system may be provided without a CPU for continuous use in the fail-operational mode of operation wherein vehicle high current loads are directly controlled by corresponding low current switches.

The present invention represents an advancement over previous control systems for controlling vehicle high current loads. During normal operation of the system, a CPU may be used to control loads in response to signals from low current switches. For example, the CPU allows the operation of numerous loads in response to a single input signal. Additionally, the CPU may provide various memory functions, e.g., in response to an input signal the CPU provides control signals for operating seat motors and rear view mirror motors for positioning seats and mirrors to a customized or programmed position. Upon failure or removal of the CPU, the system provides a fail-operational mode of operation for directly controlling certain output loads with corresponding low current switches, thereby allowing the continued operation of safety related vehicle output devices. Therefore, the control system of the present invention prevents the complete disablement of certain vehicle functions upon failure of the CPU.

Additionally, the control system may be provided without a CPU for control of high current loads directly by low current switches in the fail-operational mode of operation. This is particularly useful for simple and reliable control of those vehicle loads that do not utilize CPU inputs during normal operations.

Other objects, features and advantages of the present invention will become more apparent in the light of the following detailed description of an exemplary embodiment thereof, as illustrated in the accompanying drawings.

BEST MODE FOR CARRYING OUT THE INVENTION

The control system of the present invention is particularly well suited for controlling vehicle high current loads with low current switches. In a normal mode of operation, the control system utilizes a CPU to control the loads in response to input signals provided to the CPU by the low current switches. The control system also provides a fail-operational mode of operation during failure or removal of the CPU which provides direct operation of certain of the loads with corresponding ones of the switches.

Figure 1:
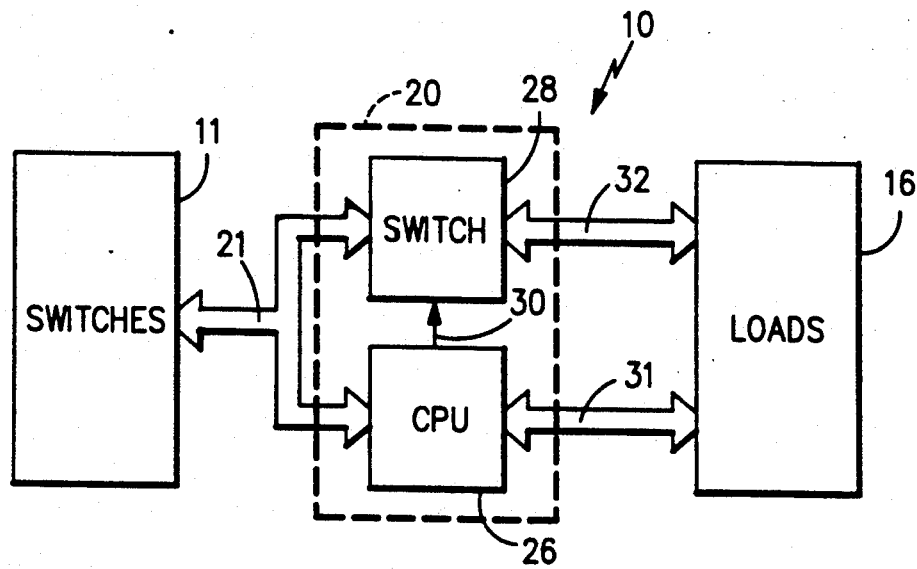
FIG. 1 is a simplified block diagram of a control in accordance with the present invention.

The basic elements of the control system of the invention are illustrated in FIG. 1. The control system 10 comprises a plurality of low current switches 11 interconnected to a plurality of corresponding high current loads 16 by control circuitry 20. The switches 11 are connected by lines 21 to both a CPU 26 and a controlled switch 28, e.g., a normally open switch.

During normal operation with the CPU installed and operational, the CPU receives input signals from the switches 11 on the lines 21. The CPU provides a control signal (valid signal) on signal line 30 to maintain the controlled switch 28 in its normally open position. In response to the input signals on the lines 21, the CPU provides control signals on lines 31 to control the loads 16, e.g., bidirectional DC inductive motors for operating power seats, power windows and windshield wipers, solenoids for operating door and trunk locks, large lamp loads, etc.

Figure 2:
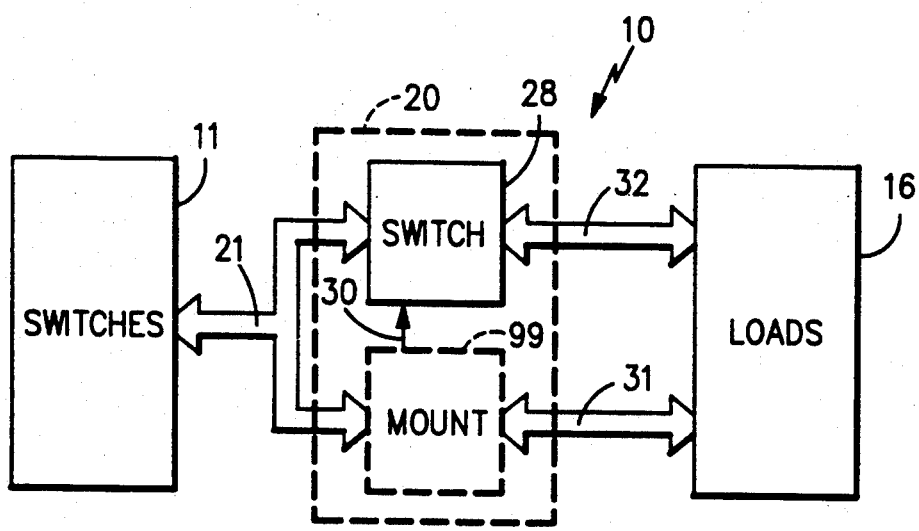
FIG. 2 is a simplified block diagram of the control system of FIG. 1 without a CPU installed.

When the CPU is not operational, or is not installed as illustrated in FIG. 2, the control system assumes a fail-operational mode of operation. In the fail-operational mode the controlled switch 28 is closed. Input signals on the lines 21 to the controlled switch 28 are then connected directly to the loads 16 on lines 32.

Figures 3, 3A:
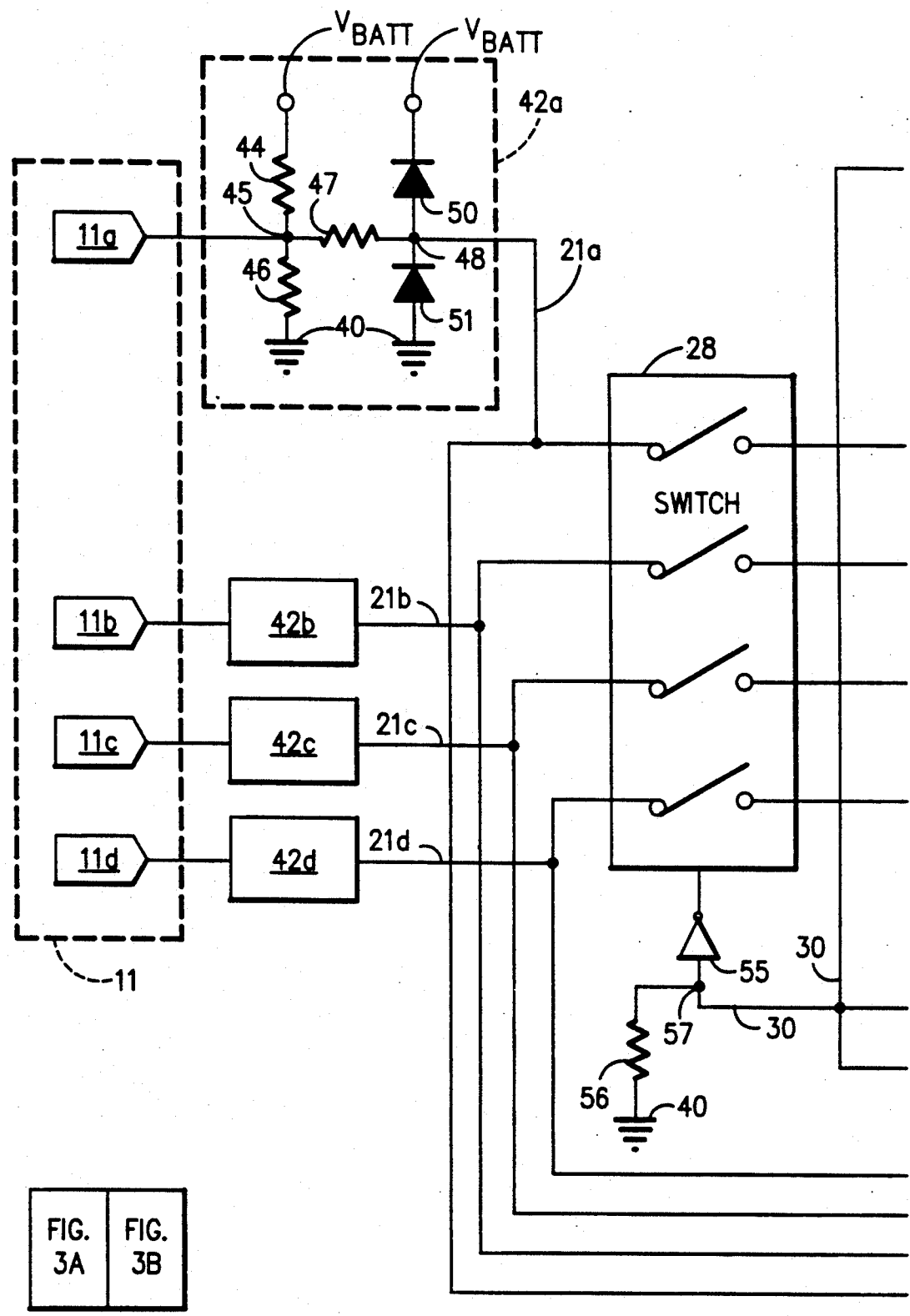
FIG. 3 is a detailed schematic block diagram of the control system of FIG. 1.
Figure 3B:
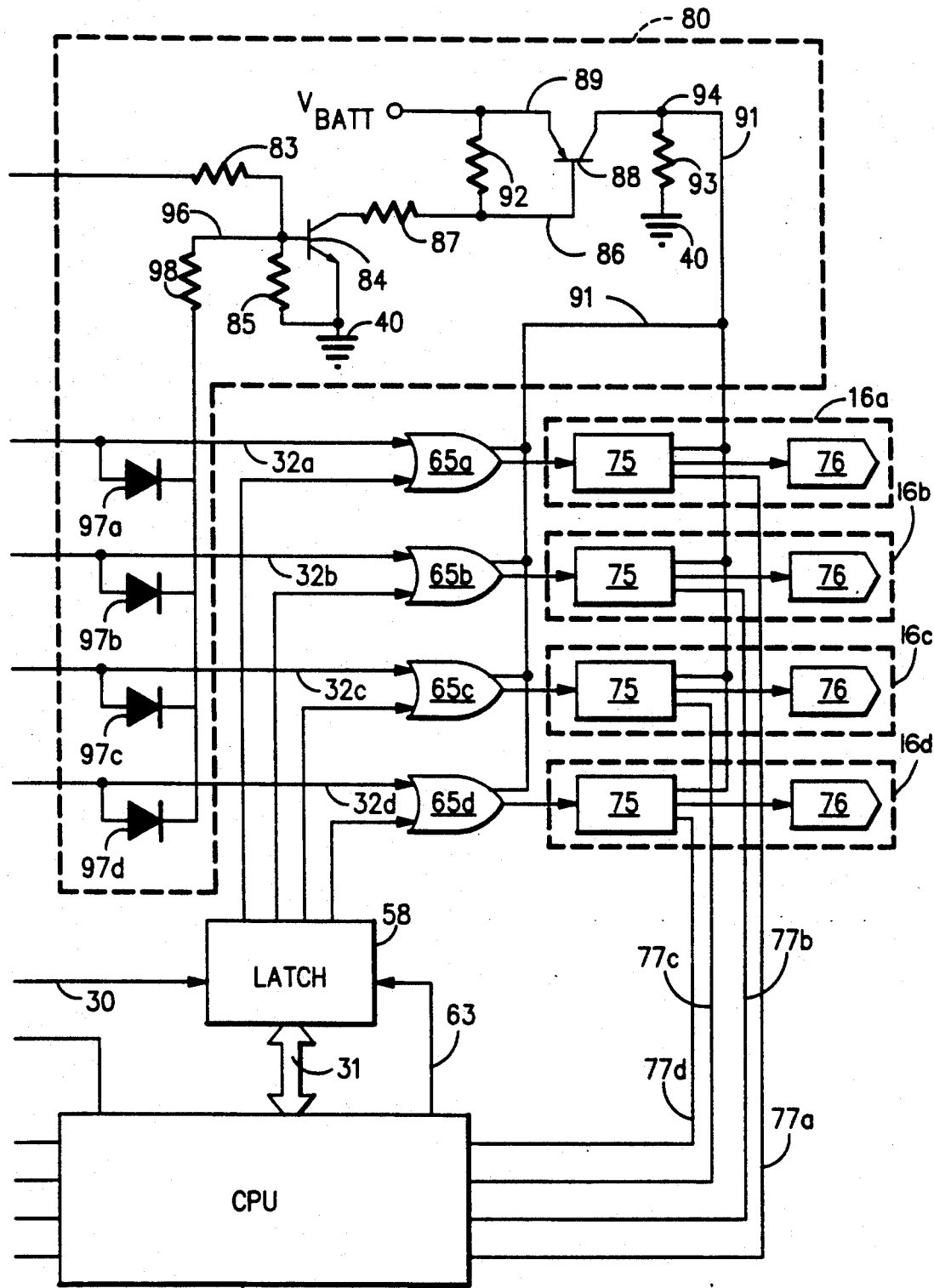

Referring to FIGS. 1 and 3, the low current switches 11, control circuitry 20, and high current loads 16 are powered by a source voltage applied with respect to a reference potential, e.g., a vehicle power supply ($V_{BATT}$) 39 typically in the range of +9 volts DC to +16 volts DC (nominally +12 volts DC), with respect to ground 40.

Low current switches 11a–d are respectively connected to both the CPU 26 and the controlled switch 28 by lines 21a–d. Conditioning circuitry 42a–d is provided between each switch 11a–d and the CPU 26 and controlled switch 28 to condition input signals to the proper electrical levels for input to the CPU or controlled switch. The conditioning circuity 42a–d is similar for each low current switch; therefore, only the conditioning circuitry 42a for one low current switch 11a is described.

The conditioning circuitry 42a includes a first resistor 44 connected between $V_{BATT}$ and a first node 45 in the signal line 21a, and a second resistor 46 connected between the first node 45 and ground 40. The first and second resistors 44, 46 are used respectively as a logic pull-up or a logic pull-down as required.

The conditioning circuitry is also provided with a third resistor 47 for transient suppression connected in series with the switch 11a between the first node 45 and a second node 48. Additionally, the conditioning circuitry includes a pair of unilaterally conducting devices, e.g., P-N junction silicon diodes, including a first diode 50 connected between the second node 48 and $V_{BATT}$ for providing a signal path from the second node to $V_{BATT}$, and a second diode 51 connected between ground 40 and the second node 48 for providing a signal path from ground to the second node. The first and second diodes respectively limit the maximum voltage and the minimum voltage applied to the control circuitry to thereby protect against over-voltage and reverse-voltage transients.

As described hereinbefore, during normal operation, the controlled switch 28 is in a normally open position, and the conditioned input signals are provided solely to the CPU 26 on the lines 21. When the CPU is installed and operational, the CPU provides a valid signal, e.g., a logic ONE having a voltage in the range +2.5 volts to +5 volts DC, on the valid signal line 30 to the controlled switch 28. An inverter 55 is provided on the valid signal line 30 between the CPU and the controlled switch 28 so that with a logic ONE on the line 30, the output of the inverter is a logic ZERO, e.g., less than +2V DC. As such, the controlled switch 28 remains in its normally open position, thereby disabling the signal path between the switches 11 and the loads 16 through the switch 28. If the valid signal is logic ZERO because the CPU is not operational or not installed, the output of the inverter 55 is a logic ONE, thereby energizing the controlled switch 28 to the energized closed position. A resistor 56 is connected between a node 57 in the line 30 and ground 40 to act as a voltage pull-down with a logic ZERO on the line 30.

During normal operation, the data output of the CPU is provided to an addressable latch 58 on lines 31. The latch 58 may contain a single semiconductor logic device or a combination of semiconductor logic devices for providing outputs to control the loads 16 in response to input signals from the CPU. The valid signal is also provided to the latch 58 on the line 30 to initialize the logic memory of the latch to a known logic state upon power up of the CPU, and to disable the latch when the CPU is either not installed or not operational. Additionally, a clock signal is provided to the latch from the CPU on a line 63. The latch is responsive to changes in input signals from the CPU only when the clock signal on the line 63 changes from logic ZERO to logic ONE.

The output of the latch is respectively provided to one input of each of a plurality of OR gates 65a–d. Similarly, the output of the controlled switch 28 is provided to a second input of each of the plurality of OR gates 65a–d on the lines 32a–d. In response to signals from either the latch during normal operations, or from the controlled switch in the fail-operational mode of operation, the OR gates provide signals to the high current loads 16 on signal lines for operation of the loads.

In the exemplary control system of FIG. 3, each of the high current loads 16a–d comprises an integrated circuit (IC) driver 75 and an output device 76. As used herein, the term "integrated circuit driver" is intended to refer to both integrated circuits and circuits comprising discrete semiconductor devices, the circuits being of the type known in the art comprising digital and analog circuitry necessary to take a low power digital input from a logic device, e.g., an OR gate, and in response provide a power output for powering a vehicle output device. For example, the driver may be of the type shown in U.S. Pat. No. 4,705,997 to Juzswik and assigned to the same assignee as the present invention, comprising a bridge driver circuit for driving power FET's configured as H-bridge drivers and used to power various bidirectional DC induction motors, e.g., windshield wiper motors, power seat motors, etc. Additionally, the driver may be a High-Side driver integrated circuit for driving power FET's configured as high-side drivers for operating vehicle lamps, fans, heaters, etc.

Lines 77a–d may be provided between the IC drivers 75 and the CPU 26 to provide feedback to the CPU as to the status of the drivers.

When energized, IC drivers represent a large power demand on the vehicle DC power supply, and therefore, a power switching circuit 80 is provided to turn off the power to the IC drivers when a vehicle ignition (not shown) is turned off, and/or when there is no input signal present The operation of the power switching circuit 80 is best understood by example. During normal operations, when the vehicle ignition is in the run or accessory position, i.e., in an operational position and not in the 'OFF' position, and the CPU is installed and operational, the valid signal on the line 30 is a logic ONE, and is provided via resistor 83 to a first transistor 84, e.g., an MPSA06 type NPN transistor. The first transistor 84 turns on in response thereto, and provides a signal on the line 86 via resistor 87 to a second transistor 88, e.g., an MPSA56 type PNP transistor. $V_{BATT}$ is also provided to the second transistor on line 89. The second transistor 88 acts as a switch or "pass through" so that when it is turned on, $V_{BATT}$ is provided on line 91 to the OR gates 65 and the IC drivers 75 to thereby power the OR gate logic circuitry and the driver circuitry and corresponding output devices. When the vehicle ignition is turned off, or when the CPU is removed or not operational, the valid signal on the line 30 is a logic ZERO, and the first and second transistors 84,88 are both off so that $V_{BATT}$ is not provided on the line 91 to power the OR gates and the loads. A resistor 93 is connected between a node 94 in the signal line 91 and ground 40 to act as a voltage pull-down when the second transistor 88 is turned off. Resistors 85 and 92 are respectively provided between the base and emitter of the first and second transistors 84, 88 for rapidly turning off the transistors.

In the fail-operational mode of operation, i.e., when the CPU is not installed or not operational and the controlled switch 28 is closed, input signals that are now provided directly to the OR gates 65 are also provided directly to the first transistor 84 on line 96, via diodes 97a–d and resistor 98. An input signal on the line 96 turns on the first transistor 84, and therefore the second transistor 88, thereby providing $V_{BATT}$ on the line 91 to power the OR gates 65 and the loads 16. When the input signal is no longer present, the first and second transistors are turned off, and $V_{BATT}$ is no longer provided on the line 91 to power the OR gates and the loads.

Referring to FIG. 1, the control system 10 is illustrated as comprising both a CPU 26 and a normally open switch 28 for fail-operational control of the output loads 16 as described with respect to the exemplary embodiment herein. However, the control system may be provided as illustrated in FIG. 2, with the CPU removed, for continuous operation of the control system in the fail-operational mode of operation. In this configuration, the loads are controlled directly by the switches via the controlled switch. The control system of the invention is therefore well suited for manufacture as a modular circuit for economical production and easy installation in an automobile. The modular circuit is simply manufactured with a mount 99 (FIG. 2) for receiving a corresponding CPU. A CPU may thereafter be installed in the mount 99 of the modular circuit where operation of the circuit in a normal operating mode is required.

The high current loads are illustrated as comprising IC drivers 75 and output devices 76; however, the invention will work equally as well with high current loads comprising relays capable of switching power to corresponding output devices in response to digital inputs from low current switches or a CPU. It will also be understood by those skilled in the art that driver circuitry comprising discrete semiconductor devices will work equally as well as IC drivers for purposes of the present invention.

Although the exemplary embodiment of the invention comprises conditioning circuitry for conditioning certain input signals, conditioning circuity is not required when signals provided by low current switches are already suitably conditioned for use by both the CPU and the controlled switch. When conditioning circuitry is used, specific components of the conditioning circuitry are populated as required to provide the proper input signal electrical levels. Additionally, the control system is described as responding to an input signal conditioned as a logic ONE for operation of the loads and power switching circuit; however, the control system may also be configured to respond to an input signal conditioned as a logic zero.

The exemplary embodiment of the invention includes a power switching circuit for reducing the power drain on the vehicle DC power supply caused by IC drivers. However, such a power switching circuit is not required in accordance with the broadest scope of the present invention, particularly when high current loads include a relay rather than an IC driver for delivering power to a vehicle output device.

In the exemplary embodiment of the invention, four low current switches are directly coupled respectively to four corresponding high current loads during operation of the control system in the fail-operational mode. However, it will be understood by those skilled in the art that the control system can be used with any number of switches and loads, and that each low current switch can be directly coupled to a corresponding one or combination of loads during operation of the control system in the fail-operational mode. Additionally, certain of the input switches may be connected only to the CPU where operation of these switches is not required in the fail-operational mode of operation.

Although the invention has been illustrated and described with respect to an exemplary embodiment thereof, it should be understood by those skilled in the art that the foregoing and various other changes, omissions and additions may be made therein and thereto, without departing from the spirit and scope of the present invention.

We claim:

1. A fail-operational control system having a normal operating mode and a fail-operational mode, comprising:
   a plurality of low current switches for providing input signals in response to the selective activation of said switches;
   a plurality of high current loads;
   means for providing control signals for selectively controlling said loads in response to said input signals and for providing a valid signal in response to the operation of said control system in a normal operating mode; and
   switching means responsive to the absence of said valid signal for selectively connecting certain ones of said switches directly to a corresponding one or combination of said loads, thereby providing said input signals directly to said corresponding one or combination of said loads.

2. A fail-operational control system according to claim 1 wherein said means for providing control signals comprises a CPU for providing said control signals for selectively controlling said loads in response to an input signal and providing said valid signal to said switching means for disabling said switching means during operation of said control system in said normal operating mode.

3. A fail-operational control system according to claim 2 wherein said means for providing control signals further comprises mounting means for mounting said CPU, said switching means being disabled and said control system operating in said normal operating mode during installation and operation of said CPU in said mounting means.

4. A fail-operational control system according to claim 1 wherein each of said plurality of high current loads comprises:
   a vehicle output device; and
   power delivery circuitry for providing power to operate a vehicle output device in response to at least of said control signals in said normal operating mode, and in response to at least one of said signals in said fail-operational mode.

5. A fail-operational control system according to claim 4 further comprising:
   a source voltage applied with respect to a reference potential; and
   power switching means for providing said source voltage to said power delivery circuitry in response to said valid signal in said normal operating mode, and in response to at least one of said input signal in said fail-operational mode.

6. A fail-operational control system according to claim 5 wherein said control signals and said input signals are digital signals, and wherein said power delivery circuitry provides power to operate a vehicle output device in response to a digital signal.

7. A fail-operational control system according to claim 6 wherein said power delivery circuitry is an integrated circuit driver.

8. A fail-operational control system according to claim 6 wherein said power delivery circuitry is a relay.

9. A fail-operational control system according to claim 6 wherein said power delivery circuitry comprises discrete semi-conductor devices 10. A fail-operational control system according to claim 1 further comprising signal conditioning circuity between said switches and said control circuitry for conditioning said input signals to provide a logic input signal to said control circuitry.

11. A fail-operational control system according to claim 10 wherein said signal conditioning circuitry further comprises:
    over-voltage protection means for limiting the maximum voltage applied to said control circuitry in response to an input signal;
    reverse-voltage protection means for limiting the minimum voltage applied to said control circuitry in response to an input signal; and
    transient suppression means to suppress input signal transients.

12. A modular, fail-operational control system, comprising:
    a plurality of low current switches for providing input signals in response to the selective activation of said switches;
    a plurality of high current loads;
    switching means for connecting certain ones of said switches to a corresponding one or combination of said loads during operation of said system in a fail-operational mode; and
    mounting means for mounting signal processing means, said switching means being disabled and said control system alternatively operating in a normal operating mode during installation and operation of signal processing means in said mounting means.

13. A modular, fail-operational control system according to claim 12 further comprising signal processing means installed for operation in said mounting means, said signal processing means providing control signals for selectively controlling said loads in response to an input signal and providing a valid signal to said switching means for disabling said switching means during operation of said control system in said normal operating mode.

14. A modular, fail-operational control system according to claim 13 wherein each of said plurality of high current loads comprises:
    a vehicle output device; and
    power delivery circuitry for providing power to operate a vehicle output device in response to a control signals in said normal operating mode, and in response to at least one of said signals in said fail-operational mode.

15. A modular, fail-operational control system according to claim 14 further comprising:
    a source voltage applied with respect to a reference potential; and
    power switching means for providing said source voltage to said power delivery circuitry in response to said valid signal in said normal operating mode, and in response to at least one of said an input signals in said fail-operational mode.

16. A modular, fail-operational control system according to claim 15 wherein said control signals and said input signal are digital signal, and wherein said power delivery circuitry provides power to operate a vehicle output device in response to a digital signal.

* * * * *